April 30, 1957 W. C. DERSCH 2,790,600

NINES-CHECKING CIRCUIT

Filed Oct. 24, 1955 2 Sheets-Sheet 1

WILLIAM C. DERSCH
INVENTOR.
BY Lyon & Lyon
ATTORNEYS

April 30, 1957 W. C. DERSCH 2,790,600

NINES-CHECKING CIRCUIT

Filed Oct. 24, 1955 2 Sheets-Sheet 2

WILLIAM C. DERSCH
INVENTOR.

BY Lyon & Lyon

ATTORNEYS

United States Patent Office

2,790,600
Patented Apr. 30, 1957

2,790,600

NINES-CHECKING CIRCUIT

William C. Dersch, Los Altos, Calif.

Application October 24, 1955, Serial No. 542,353

4 Claims. (Cl. 235—61)

The method of checking by nines has been known for a long time. It may be employed for checking the correctness of code numbers which are assigned by requiring that the sum of all of the digits in the code number always should be equal to nine. Thus, a number may be assigned to identify each of different items which are in a stock for inventory purposes. One digit position may be reserved for the insertion therein of a number which will bring the sum of all the numbers to nine. Thus, the number 763 totals 16. A fourth digit position may be added for the digit 2, making 7632. Thus, the sum of all the digits will be divisible by 9. Or, if desired, selected digit positions of a large number may be the ones added and thus checked, so that if the entire number has been correctly handled in all of the previous processes the sum of these digits should always come out to 9. This is a useful check for determining whether or not numbers have been correctly described where a large number of different steps were performed in the handling of the data accompanying or resulting in these numbers is employed. Another useful application of the nines-checking circuit may be in checking the numbers applied to checks such as Travelers' Checks. Certain ones of the digits of these numbers are selected. Their sum must always be divisible by 9. If it is not divisible by 9, then it is known that a forgery has occurred.

Heretofore, this nines check did not find extensive use, since the addition required had to be done manually or by using an adding machine. In an application by Kenneth R. Eldredge for an Automatic Reading System, filed May 6, 1955, Serial No. 506,598, and assigned to a common assignee, there is shown how information written in human language may be automatically read and converted to machine language. More specifically, by the writing or printing of numbers in magnetic ink, an arrangement is described whereby these numbers may be magnetized and signals detected by passing a magnetic transducer across these numbers, which signals are characteristic for each number. These characteristic signals are then converted into a binary code by means of which information-handling apparatus, sorting apparatus, or any other suitable machinery may receive the information which has been read from the paper and may either process the information or sort the paper from which it has been taken in accordance therewith.

One of the applications for the invention described has been to read identification numbers on documents. Since a means is provided for automatically reading these numbers, it is desirable to automatically nines check each number that has been read.

Accordingly, an object of the present invention is to provide a means for automatically nines checking signals representative of decimal numbers.

Another object of the present invention is to provide a circuit which permits automatic nines checking.

Still another object of the present invention is the provision of a novel, useful, and simple circuit which can accomplish nines checking of decimal numbers.

These and other objects of the invention are achieved in a circuit arrangement whereby a decimal number has each of the digits converted in turn to the complement of the number 16. This complement is expressed as a binary number. A first counter is set to represent the complement. This counter has a total count capacity of 16. Means are provided to apply pulses to this counter until it is reset. Simultaneously therewith a second counter counts the pulses being applied. The second counter is reset to its zero count condition each time it counts nine pulses. Each one of the decimal digits in the number being nines checked is applied to the circuit in sequence. Accordingly, after they all have been applied if the number is correct in accordance with the nines check, the second counter should be in its zero count condition. Means are provided to sense the condition of the second counter and to indicate whether or not this is the case.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
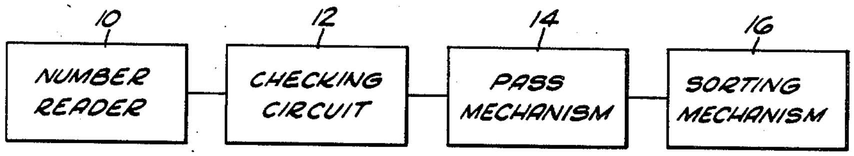
Figure 1 is a block diagram of a system which employs this invention and is shown to set forth the utility thereof.

Referring to Figure 1, there is a block diagram of an arrangement wherein the embodiment of the invention is employed. A number reader 10 reads numbers in sequence which are printed on a document, which is passed thereunder. An arrangement for performing this operation automatically is shown, described, and claimed in the previously noted application to Kenneth R. Eldredge. The output of the number reader is applied to a nines complementer 12. The output of the nines complementer is applied to a pass mechanism 14 which operates to control a sorting mechanism 16 to pass or reject the document from which a number had been read. A suitable sorting mechanism is described in an application by Alonzo W. Noon for an Auotmatic Separating System, Serial No. 407,347, filed February 1, 1954, and assigned to a common assignee. This mechanism shows means for sorting into various different categories different documents. One of these categories can be a reject category which is the one into which those documents bearing numbers which do not pass the nines check are sorted.

It has been started that a suitable mechanism for obtaining electrical signals representative of the digits of a decimal number is shown in the application to Kenneth R. Eldredge. This is not to be considered as a limitation upon the invention, since this invention will also operate in response to any means for applying thereto decimal signals. One source of decimal signals may be a keyboard from which ten different leads emanate. Each of these leads is connected to a different key, which respectively bears the numbers from zero to nine. When a key is depressed, it will excite the associated one of the leads, whereby a decimal digit is expressed electrically by the presence of a voltage on one of the ten different leads.

Figure 2:
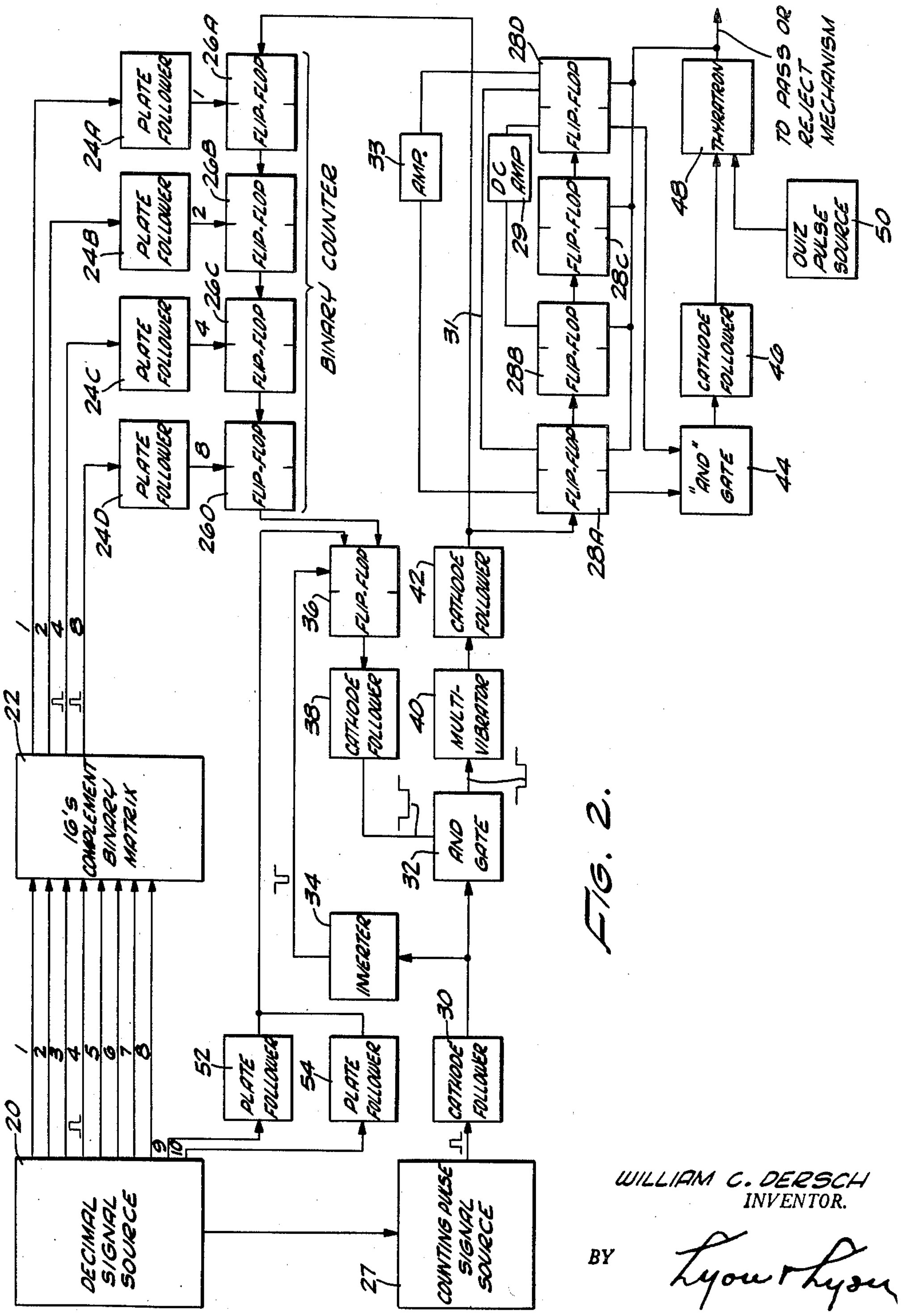
Figure 2 is a block diagram of an embodiment of the invention.

Referring now to Figure 2, there is shown a block diagram of the invention. A decimal signal source 20, which may be one of the types previously mentioned, can supply a voltage to one of ten different leads. This will represent the electrical equivalent of a decimal digit. The leads are numbered from zero through nine, to correspond with the decimal digit on a keyboard, for example. Eight of these ten leads, which respectively bear the numbers from one through eight, are connected to a network 22 bearing the designation sixteens-complement binary matrix. This network has the property of providing an output on four leads, which represents electrically the sixteens complements of the decimal-number input expressed as a binary number. In other words, the output of the matrix network is a binary number which represents the difference between the number 16 and the input decimal number. This binary-number output will be the presence or absence of pulses on the four leads which connect the output of the matrix to four plate-follower circuits, respectively designated as 24A, 24B, 24C, 24D. These plate-follower circuits are connected to flip-flops 26A through 26D, which are interconnected to form a binary counter. A plate-follower circuit, as shown in more detail in Figure 4, comprises a tube which has as its plate load the plate load of one of the two tubes of the flip-flop with which it is associated. Accordingly, a positive signal applied to a plate-follower circuit will cause the tube to conduct, and the tube on the side of the flip-flop to which it is coupled is also made to conduct. In this manner, the plate followers are able to set the binary counters 26A through 26D to a count condition representative of the output of the binary matrix. Since the counter comprises four flip-flop stages, its maximum capacity is a 16 count.

Simultaneously with the application of a decimal signal pulse, a counting pulse-signal source 27 provides a pulse output. This source may consist of an Or gate, which provides an output when any one of the decimal-signal-source leads is energized. Alternatively, the source may be a source of clock pulses which are used for timing the decimal-signal pulses. The output thereof, comprising a pulse, is applied to a cathode-follower circuit 30. Its output is applied to an And gate 32 and to an inverter 34. The inverter may comprise a one-stage amplifier whose output is reversed in polarity from that of the cathode follower.

The inverter output is applied to a flip-flop 36. This flip-flop, as is well known, has two stable conditions. It is driven into one of them by the inverter, thus applying an output to a second cathode follower 38. The second cathode-follower output is applied to the And gate 32 as its second required input. The And gate is then able to pass a bias voltage to unblock a multivibrator 40. This multivibrator can then commence oscillating and thus providing output pulses. These are applied to the cathode follower 42. The cathode follower applies these pulses to both the binary counter 26 and to a second binary counter 28. Since the first binary counter is already in a count condition representative of the difference betwen the decimal number and 16, the number of pulses required to fill it or bring it to the zero count condition will be equal to the value of the decimal number. Accordingly, when the first binary conuter fills, it will provide an output to the flip-flop 36, which serves to reset the flip-flop to its initial stable condition. Effectively, the first counter operates as a predetermined counter. Upon reset, And gate 32 no longer passes a bias voltage to the following multivibrator 40, which then is prevented from further oscillations.

The second counter is a "nines counter." It is used to count the pulses required to fill the first counter. It is initially in a zero count condition, but upon the application of nine pulses it counts to nine. Upon receiving a tenth pulse, the "nines counter" returns to a one count condition, instead of zero. It will then count up to nine again, in response to the continued application of pulses and is then returned to one again. At the completion of a "nines check" the count of the counter is inspected. If it is a nine, the check is correct. The counter may then be reset to zero for the next "nines check" cycle.

The second counter is basically a four-stage binary counter, the same as the first counter. However, its count sequence is altered from sixteen counts to recycling nines count, using feedback and feed-forward techniques between the counter stages in the manner taught by H. Lifschutz in an article in the Physical Review, vol. 57, pp. 243–244, February 1940, entitled New vacuum tube circuit of arbitrary integral or fractional scaling ratio, as well as by I. E. Grossdoff in the RCA Review, vol. 7, pp. 438–447, September 1946, in an article entitled Electronic counters. The four-stage second counter counts up to eight in the customary binary fashion. On the count of eight, the fourth stage 28D, which is driven to its "one condition," through direct-coupled amplifier 29 clamps the second flip-flop stage 28B to its "zero condition." Thus, the succeeding, or ninth, pulse applied to the first flip-flop stage 28A turns it to its "one condition." The "one condition" of the first and fourth stages (totaling nine) may be sensed by the And gate 44, which can then produce an output. However, the next, or tenth, pulse applied to the counter at first returns the first stage to its "zero condition." Normally, this would produce an output at this time to drive the second stage to its zero condition, but in view of the clamping action from the fourth stage, via the direct-coupled amplifier 29, the second stage remains in its zero condition. However, the fourth stage is now in condition to be driven by a pulse from the first stage derived when it has turned over. This pulse is applied along lead 31 and succeeds in turning the fourth stage back to its zero condition. This, of course, unclamps the second stage so that it is free to operate as before. The fourth stage, in turning over, generates a pulse which is applied through amplifier 33 to the first stage to drive it back to its "one condition." Thus, the application of a tenth pulse to the second counter results in a count of one.

The And gate 44 applies an output to a cathode follower 46 each time the nines counter is in its nines count condition. The cathode follower output is applied to a thyratron 48. The thyratron requires a second input before it can be fired. Output from the thyratron may be employed to reset the second counter. The required second input is derived from a quiz pulse source 50 when a complete number or word (assuming an alpha-numeric coding) has been entered into the nines-checking circuit. This may be done in well-known manner by a signal generated when no further numbers are being entered, or by the document on which the number appears reaching the sorting position. The output of the thyratron may be employed to control a "pass" or "reject" mechanism and, also, to indicate whether or not the number which has been entered into the mechanism passes the nines check.

The zero and nine leads from the decimal-signal source are respectively applied to two plate-follower circuits 52, 54. These provide an output which prevents the flip-flop 36 from being tripped to open And gate 32, whereby multivibrator 40 can commence oscillating. This precaution is taken, since the digit nine and the digit zero will only serve to cycle the first counter to a zero condition, and a false 16 count would occur. Accordingly, these digits cannot be entered into the circuit.

In summary of the operation, therefore, a signal representative of a decimal digit in a number or word to be nines checked is applied to a matrix circuit. This matrix circuit provides as an output a binary number which is the complement of the decimal number with respect to the number 16. This binary number is entered into a first counter having a capacity of 16. A pulse source is then energized to provide pulses to fill this first counter. Thereby, a train of pulses is generated with the number of the pulses in the train corresponding to the value of the original decimal digit. This pulse train is entered into a second counter. This second counter is recycled to one, and not zero, each time it attains a nine count. The total word count in the nines counter is sensed to indicate that the decimal word which has been entered into the system a digit at a time passes or does not pass the nines counter.

Figure 3:
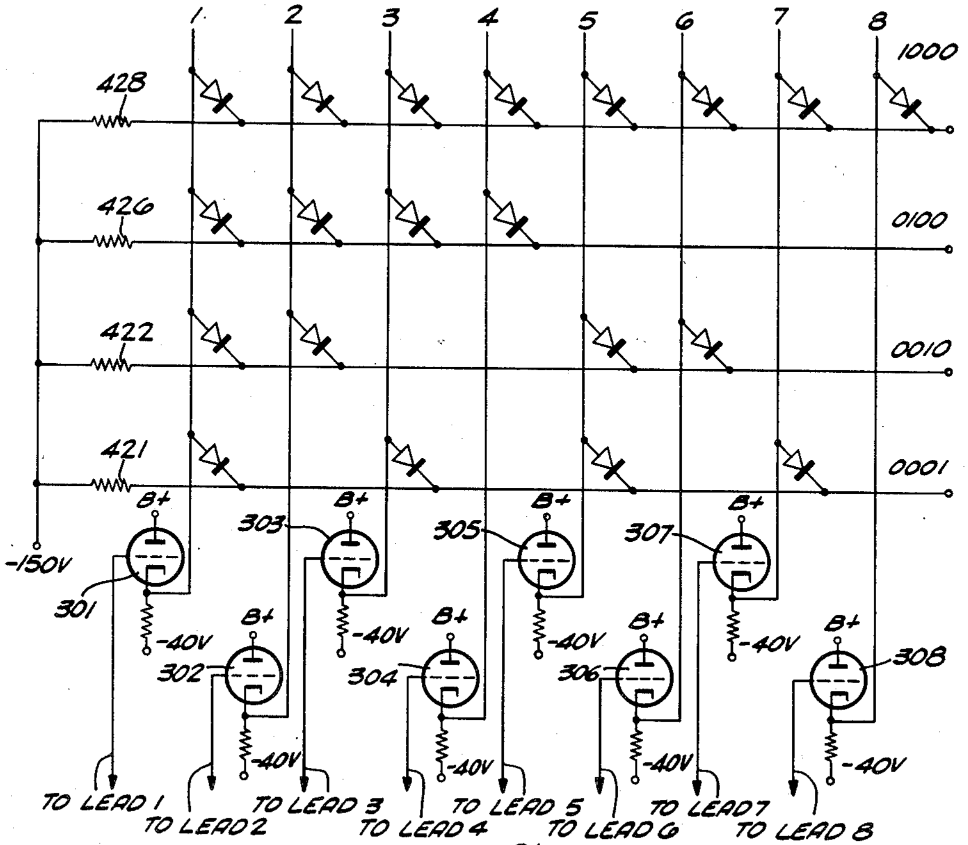
Figure 3 is a schematic of a sixteens-complement binary matrix which is employed in the embodiment of the invention.

Figure 3 is a circuit diagram of a matrix circuit which may be employed in the embodiment of the invention to convert a decimal-digit input into a sixteens-complement binary number. The vertical network leads designated by the numbers one through eight correspond to the leads so designated in Figure 2 as emanating from the decimal-signal source 20. However, coupling each lead emanating from the decimal-signal source and its associated lead in the matrix network is a cathode-follower tube 301—308. Each cathode-follower tube has a resistor in its cathode lead, as is customary. This resistor is connected to a negative bias. The drive for the network lead is derived from the cathode. The horizontal network leads are each designated by the binary number which it represents when it is excited. Lead 0001 is coupled to drive plate follower 24A. Lead 0010 is coupled to drive plate follower 24B. Lead 0100 is coupled to drive plate follower 24C. Lead 1000 is coupled to drive plate follower 24D. The other ends of these leads, which are not coupled to the plate followers, are connected through resistors 421, 422, 424, 428 to a source of negative potential.

Diodes are connected between lead 1 and leads 0001 to 1000, so that when lead 1 is excited by the cathode follower 301 being driven, all the binary output leads provide positive output pulses, thus all the flip-flops in the first counter are driven to their "one-representative" condition. The count entered is 15. Thus, one pulse is all that is required to reset the first counter to zero count again. Lead 2 is connected by diodes to lead 1000, 0100, and 0010, totaling a binary fourteen, or 1110. The first counter is thus set to binary number fourteen when the 2 lead is excited. The logic involved in making the diode connections between the decimal-input leads and the binary-output leads should now become apparent from the above. Diodes connect a decimal-input lead to those of the binary-output leads whose representative sum is the binary number which is the sixteens complement. Thus, lead 7 is connected to leads 1000 and 0001, totaling 1001, or nine.

Figure 4:
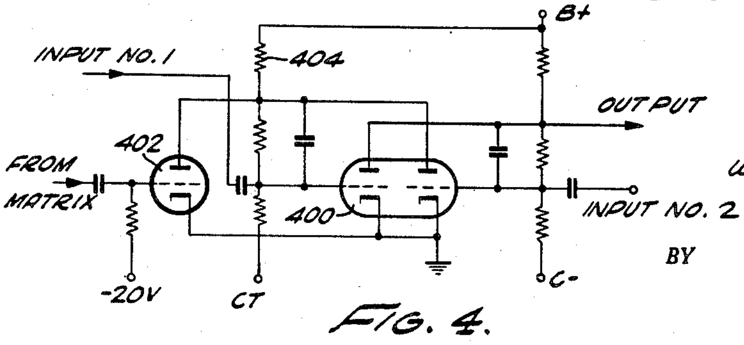
Figure 4 shows a circuit diagram of a plate follower and flip-flop which are basic components employed in the embodiment of the invention.

Referring now to the circuit diagram shown in Figure 4, there is seen by way of illustration how a flip-flop stage 400 may be set to a stable condition representative of a binary one by exciting the grid of the plate follower 402. The plate follower has its anode connected to a resistor 404 which is also the load for one side of the flip-flop circuit 400. The plate follower is normally biased to cut off, whereby the flip-flop circuit can function independently of the plate follower. Accordingly, the grids and an anode of the flip-flop circuit, respectively designated as the input and output leads, may be connected to other flip-flop stages to form a binary counter in well-known manner.

When positive signals are received from the matrix network, the plate followers to which they are applied are rendered conductive. Each draws current through the common plate load, whereby a negative signal is applied to the grid of the other flip-flop triode through the grid-anode cross-coupling network in well-known manner, whereby the other flip-flop triode is cut off, enabling the flip-flop triode to which the plate follower is coupled to become conductive.

Counters, flip-flops, and multivibrators of the type described are well known in the art, being extensively described in the literature, as, for example, the book entitled Time Bases, by Oscar Puckle, published by John Wiley & Sons in 1943. And gates of a suitable type for utilization herein are also well known and are found described in an article by Felker entitled Typical block diagrams for a transistor digital computer, vol. 71, No. 12, December 1952 edition of Electrical Engineering.

Therefore, a detailed description of these circuits is omitted.

Accordingly, there has been described and shown hereinabove a novel, useful, and simple nines-checking circuit. The circuit can be used for checking either the accuracy of handling or the authenticity of decimal numbers.

I claim:

1. A nines-checking circuit for a plurality of decimal digits comprising means to establish a pulse train for each digit in said plurality having the same number of pulses as the value of said digit including means to obtain the complement of each digit with respect to the number sixteen in the binary-number system, and means to generate a pulse train having a number of pulses equal to the difference between sixteen and the complement of said digit, means to count each of said pulse trains in a series sequence, means to recycle said means to count after each count of nine, and means to indicate whether or not said means to count is in a nine-count condition at the end of the count of said pulse trains.

2. A nines-checking circuit for a plurality of decimal digits comprising means to establish a pulse train for each digit in said plurality having the same number of pulses as the value of said number including means to obtain the complement of a digit with respect to the number sixteen in the binary-number system, a first binary counter having a total count capacity of sixteen, means to establish said first binary counter into a count condition representative of said complement, and means to apply pulses to said first binary counter until it is filled, a second counter, means to apply said pulse train for each number in sequence to said counter to be counted, means to recycle said counter whenever it has counted to nine, and means to indicate whether or not said means to count is in a nine-count condition at the end of the count of said pulse trains.

3. A nines-checking circuit for a plurality of decimal digits as recited in claim 2 wherein said means to apply pulses to said first binary counter until it is filled includes a multivibrator circuit, a flip-flop circuit having a first and a second stable condition, means coupling said flip-flop circuit to said multivibrator to prevent its oscillation when in its first stable condition and to permit its oscillation when in its second stable condition, means to apply the output of said multivibrator to said first counter, means to establish said flip-flop in said first stable condition when said first binary counter is established into a count condition representative of a complement, and means to apply an output from said first binary counter when it is filled to said flip-flop to establish it in its first count condition.

4. A nines-checking circuit for a decimal number consisting of a plurality of digits comprising circuit means for converting a decimal-digit input into a sixteens-complement binary-number output, means for applying the digits of said decimal number in sequence to said circuit means, a first binary counter having a total count capacity of sixteen, means to set said first binary counter to the count condition represented by the output of said circuit means, means to apply pulses to said first counter until it is filled to its total capacity, means to count the pulses being applied to said first binary counter until it is filled, means to recycle to a one-count condition said means to count after it attains a nine-count condition, and means to sense the condition of said means to count after all the digits of said decimal number have been applied to said circuit means to indicate whether said number is one that nines checks.

References Cited in the file of this patent

UNITED STATES PATENTS 2,731,201 Harper ---------------- Jan. 17, 1956